(12) United States Patent
Hu

(10) Patent No.: US 6,189,660 B1
(45) Date of Patent: Feb. 20, 2001

(54) RATCHET WHEEL DEVICE FOR A BABY WALKER

(76) Inventor: Stephen Hu, No. 2, Ta-Tung Road, Hsin-Chu Industrial Park (TW)

( * ) Notice: Under 35 U.S.C. 154(b), the term of this patent shall be extended for 0 days.

(21) Appl. No.: 09/213,737

(22) Filed: Dec. 17, 1998

(51) Int. Cl.[7] .................................................. F16D 63/00
(52) U.S. Cl. .......................................................... 188/82.1
(58) Field of Search .................................. 303/82.1, 82.7, 303/82.3, 82.34, 82.77, 82.8, 82.84

(56) References Cited

U.S. PATENT DOCUMENTS 5,090,521 * 2/1992 Miura .................................. 188/82.1

* cited by examiner

Primary Examiner—Matthew C. Graham

(74) Attorney, Agent, or Firm—Pro-Techtor International Services

(57) ABSTRACT

A ratchet wheel device for a baby walker provided on the bottom surface of a chassis of the baby walker, it is comprised of a wheel rim, two transmitting gears, a transmitting member and a cover. The wheel rim is provided therein with a receiving chamber. The two transmitting gears are mounted on both sides of the receiving chamber and can fitly move therein and can be stopped by two stop portions in the receiving chamber. The transmitting member is provided in the receiving chamber and fixed on the chassis of the baby walker. A plurality of engaging teeth are provided thereon to engage with the transmitting gears. When the wheel rim is rotated to a specified direction, the two transmitting gears will not interact with the stop portions. While when it is rotated in the contrary direction, the two transmitting gears will be engaged by the transmitting member to be stopped by the stop portions and to limit rotation of the wheel rim. In this way, the device allows rotation only in a single direction, so that the baby walker can be safer in use.

7 Claims, 4 Drawing Sheets

RATCHET WHEEL DEVICE FOR A BABY WALKER

BACKGROUND OF THE INVENTION

1. Field of the Invention

The present invention relates to a ratchet wheel device for a baby walker, and especially to such a ratchet wheel device capable of rotating only to one direction. When the ratchet wheel device is mounted on the chassis of the baby walker, it can prevent the baby walker from retrogression, and using of the baby walker can be safer.

2. Description of the Prior Art

A baby walker is provided for a baby to learn walking sitting therein. The baby can walk to any direction he wants to go, so that the baby walker is more practical in use. However, random moving of the baby walker increases danger to the baby using it. The center of gravity of the baby is located at the more rear area of the baby walker, the baby is subjected to falling down stairs or down on an uneven ground to make big hurt. Therefore, manufacturers commonly change the rear wheels on the baby walker into ratchet wheels under the condition not completely impeding the practicality of using of the baby walker. The ratchet wheels are made each to be capable of rotating only to one direction. So that when in use, the baby walker can only be moved straight forwards rather than moved straight backwards or transversely. In this way, safety in using of the baby walker is increased.

SUMMARY OF THE INVENTION

In view of the above statement, the inventor of the present invention provides after hard study a ratchet wheel device for a baby walker. The device allows rotation in a single direction, so that the baby walker can be safer in use.

The primary object of the present invention is to provide the ratchet wheel device for a baby walker that allows rotation in a single direction in order to prevent the baby walker from moving straight backward or laterally when it is mounted on the baby walker.

Another object of the present invention is to provide the ratchet wheel device for a baby walker that is convenient for assembling and can lower cost of production.

The present invention will be apparent in its contents of technique after reading the detailed description of the preferred embodiments of the present invention in reference to the accompanying drawings, wherein:

DETAILED DESCRIPTION OF THE PREFERRED EMBODIMENT

Figure 1:
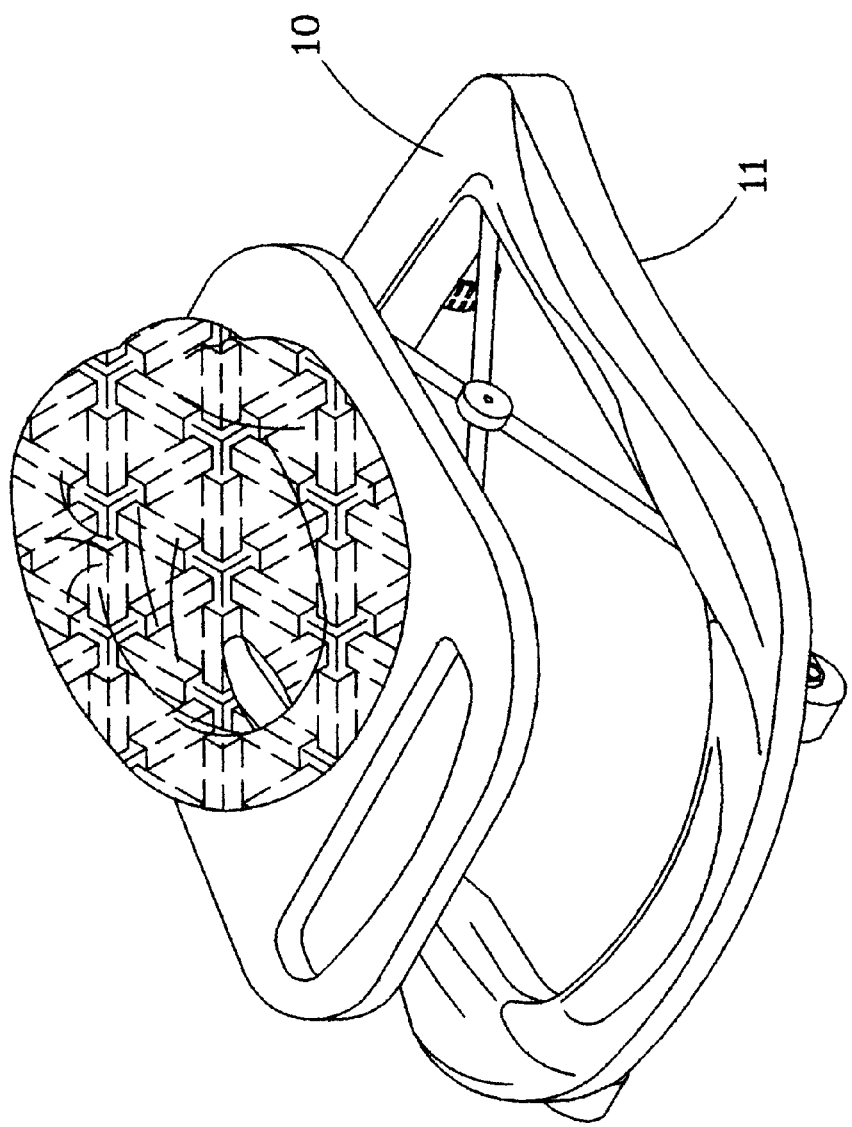
FIG. 1 is a perspective view showing practice of the present invention on a baby walker.
Figure 2:
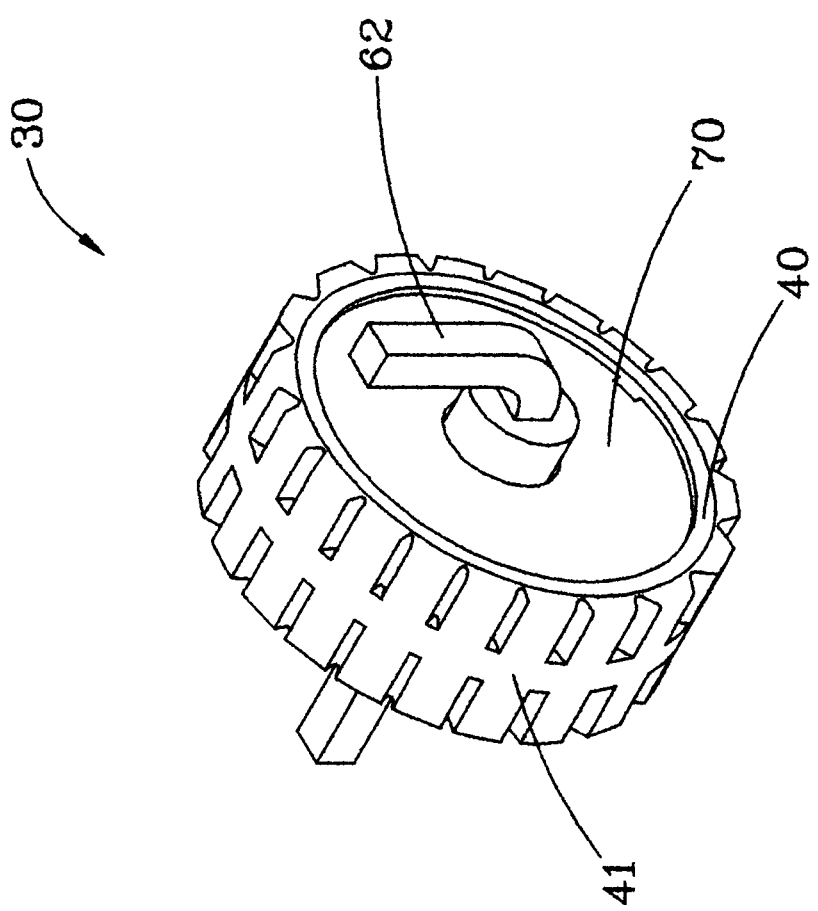
FIG. 2 is a perspective view of a ratchet wheel device of the present invention.
Figure 3:
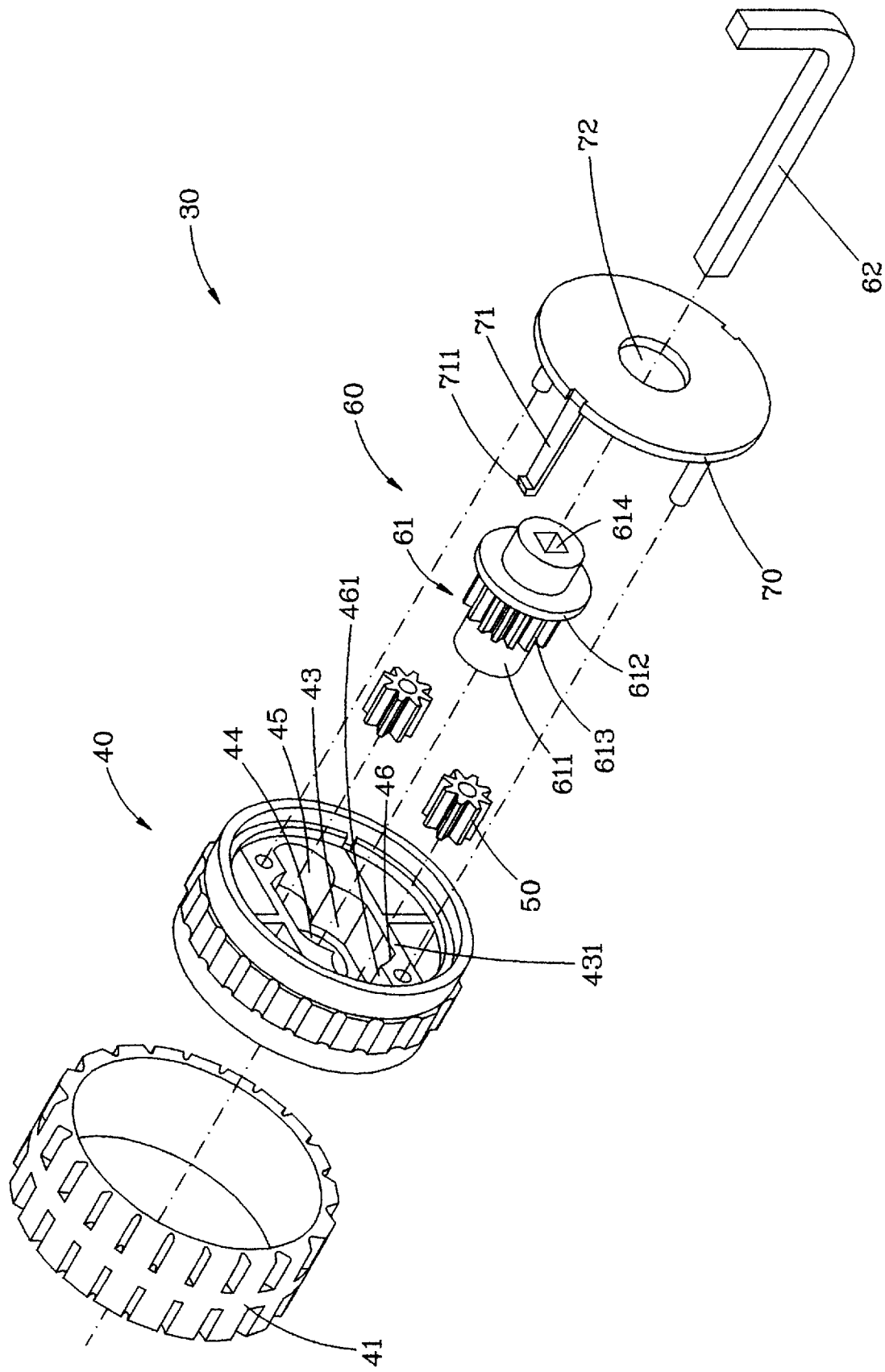
FIG. 3 is an analytic perspective view of the ratchet wheel device for the baby walker of the present invention.

Referring firstly to FIG. 1 of the drawings, a plurality of ratchet wheel devices 30 of the present invention allowed to rotate in a single direction are provided on the bottom surface of the chassis 11 of a baby walker 10. The baby walker 10 thus is prevented from moving straight backwards or laterally and thereby to increase safety of use of the baby walker 10. Referring also to FIGS. 2 and 3, a ratchet wheel device 30 of the present invention is comprised of a wheel rim 40 with a tire 41, two transmitting gears 50, a transmitting member 60 and a cover 70.

The wheel rim 40 is provided over it with the tire 41 for moving on a ground, a receiving space is formed therein and has a receiving chamber 43 with an opening 431. The receiving chamber 43 is provided with an axial hole 44 and two symmetrically disposed side gear-chambers 45 closely neighboring with the axial hole 44. The walls of the side gear-chambers 45 are arciform and are provided at suitable positions thereon respectively with a stop portion 46. The stop portions 46 in the embodiment neighbor with the axial hole 44 and each is provided with a flange 461. By means of the flanges 461, moving of the two transmitting gears 50 can be stopped thereby, thus rotation of the wheel rim 40 can be limited.

The two transmitting gears 50 are mounted in the two symmetrically disposed side gear-chambers 45 through the opening 431 of the receiving chamber 43 in the wheel rim 40. The size of the transmitting gears 50 allow them to fitly move in the two symmetrically disposed side gear-chambers 45. When they are moved to an appropriate distance, the teeth thereof will be stuck by the flanges 461 in the transmitting gears 50 to limit their rotation.

The transmitting member 60 includes a sleeve 61 and a fixing rod 62. One end 611 of the sleeve 61 is extended into the axial hole 44 of the receiving chamber 43. Near the other end of the sleeve 61 is a disk 612 having a plurality of engaging teeth 613 engaging with the transmitting gears 50. The fixing rod 62 is extended into the sleeve hole 614 of the sleeve 61 and extended out of the sleeve hole 614 to be fixed on the chassis 11 of the baby walker 10. The other end of the fixing rod 62 is bent to form an "L" shape, and is also fixed on the chassis 11 of the baby walker 10 to be explained hereinafter. Therefore, when the wheel rim 40 is rotated to a specified direction, the two transmitting gears 50 will interact with the transmitting member 60 while the wheel rim 40 is rotated freely. When it is rotated in the contrary direction, the two transmitting gears 50 will too interact with the transmitting member 60 but to push the wheel rim 40 to one direction. Thereby, the two transmitting gears 50 can be stopped by the stop portions 46 (or the flanges 461) in the two symmetrically disposed side gear-chambers 45, and rotation of the wheel rim 40 can be limited.

The cover 70 is used to cover the wheel rim 40. Two mutually diagonally opposite bars 71 are orthogonally extended from the peripheral edge of the cover 70, and two inverted hooks 711 are provide in the front of the bars 71 for fixedly engaging the wheel rim 40. A central hole 72 is provided on the cover 70 to allow insertion of the fixing rod 62 of the transmitting member 60.

Figure 4:
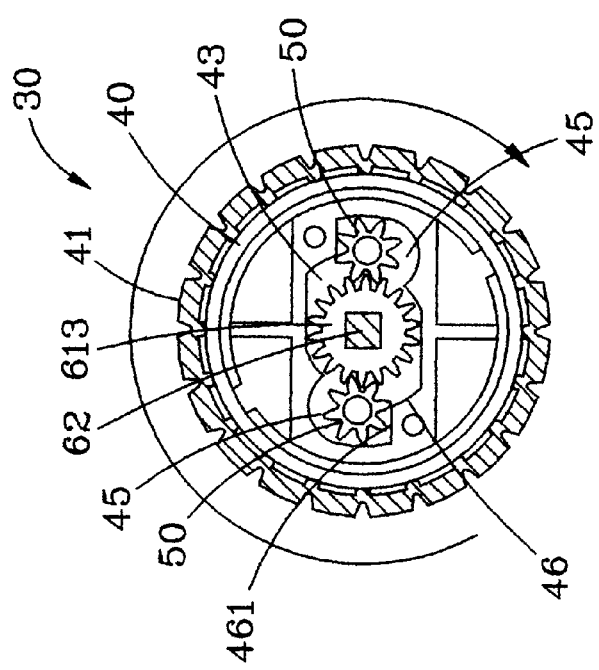
FIG. 4 is a sectional view of the present invention.

Referring to FIG. 4 that is a sectional view of the present invention, the transmitting member 60 is fixed on the chassis 11 of the baby walker 10, while the way of fixing will be described hereinafter. When the wheel rim 40 is rotated clockwise as shown in the drawing, it brings the two transmitting gears 50 to rotate relative to the transmitting member 60. The transmitting member 60 pushes the two transmitting gears 50 respectively to a certain direction to release the two transmitting gears 50 from being engaged with the stop portions 46 (or the flanges 461) in the two symmetrically disposed side gear-chambers 45. So that the wheel rim 40 can keep on rotating.

On the contrary, when the wheel rim 40 is rotated in a contrary direction, the transmitting member 60 will push the two transmitting gears 50 to engage the stop portions 46 when the transmitting gears 50 are to drive the transmitting member 60. In this way, the two transmitting gears 50 engage respectively the stop portions 46 (or the flanges 461) in the two symmetrically disposed side gear-chambers 45, thus the wheel rim 40 will not be further rotated.

Accordingly, the ratchet wheel device 30 of the present invention is rotated only in one direction. When it is mounted on the chassis 11 of the baby walker 10, the baby walker 10 does not move straight backwards or transversely.

Figure 5:
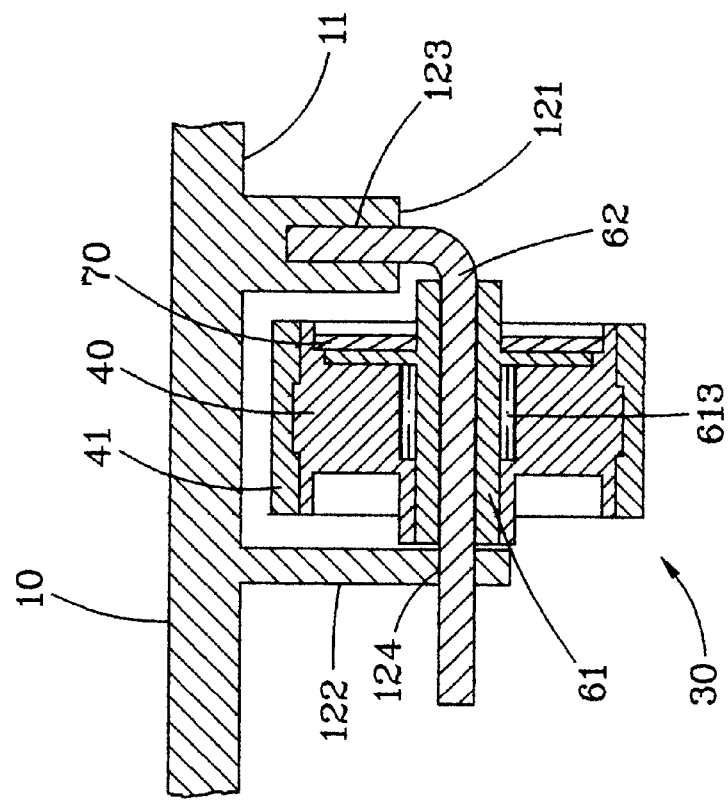
FIG. 5 is a schematic sectional view showing mounting of the present invention on the chassis of the baby walker.

Referring to FIG. 5 which is a schematic sectional view showing mounting of the present invention on the chassis 11 of the baby walker 10, two fixing portions 121, 122 suitably separated from each other are provided at the location where the ratchet wheel device 30 is to be mounted. One of the fixing portions 121 is provided with a vertical hole 123, while the other fixing portion 122 is provided with a fixing hole 124. The ratchet wheel device 30 is mounted between the two fixing portions 121, 122. One end of the transmitting member 60 is extended into the fixing hole 124, while the other end ("L" shaped) thereof is inserted into the vertical hole 123 of the fixing portion 121. So that the ratchet wheel device 30 is fixed on the chassis 11 of the baby walker 10.

In this way, when the wheel rim 40 is rotated in a specified direction, wherein, the transmitting gears 50 do not engage the stop portions 46 in the two symmetrically disposed side gear-chambers 45. So that the wheel rim 40 can rotate in this direction. On the contrary, when the wheel rim 40 is rotated in a contrary direction, the sleeve 61 of the transmitting member 60 will push the two transmitting gears 50 to engage the stop portions 46 (or the flanges 461). Thus the wheel rim 40 will not rotate further in the contrary direction, and can only be rotated in a single direction.

Two ratchet wheel devices 30 are provided on the lateral sides at the rear portion of the chassis 11 of the baby walker 10. The ratchet wheel devices 30 are adjusted for their direction of rotation to prevent the baby walker 10 from moving straight backwards or transversely. So that a baby can move for learning walking in a safe way sitting on the baby walker 10. And more, the ratchet wheel devices 30 can be assembled in a convenient way, this can lower their cost of production.

By the above stated structural combinations, the ratchet wheel devices for a baby walker of the present invention can achieve the objects of the present invention. I.e.: they are rotated only in a one direction to prevent the baby walker from moving straight backwards and they can be assembled in a convenient way to lower their cost of production. The present invention therefore is industrially valuable.

Having thus described my invention, what I claim as new and desire to be secured by Letters Patent of the United States are:

1. A ratchet wheel device on a baby walker, said ratchet wheel device is provided on the bottom surface of a chassis of said baby walker, and is comprised of:
   a wheel rim forming therein a receiving space having a receiving chamber with an opening, said receiving chamber is provided with an axial hole and at least a side gear-chamber adjacent said axial hole, walls of said side gear-chambers are provided with stop portions;
   at least a transmitting gear mounted in said side gear-chambers through said opening of said receiving chamber in said wheel rim and moving in said side gear-chambers, the teeth thereof are obstructed from movement by flanges provided on said walls of said transmitting gears to limit their rotation;
   a transmitting member fixed on said chassis of said baby walker, one end thereof is extended into said axial hole of said receiving chamber, near the other end of said receiving chamber are a plurality of engaging teeth in transmission engagement with said at least one transmitting gear, such that when said transmitting gears are stopped by said stop portions in said side gear-chambers, rotation of said wheel rim is limited;
   when said wheel rim is rotated in a first direction, said transmitting gears do not engage said stop portions in said side gear-chambers, so that said wheel rim is rotated in said first direction; when said wheel rim is rotated in a second direction, said transmitting member pushes said transmitting gears to engage said stop portions, such that said wheel rim rotates in one direction only.

2. The ratchet wheel device on a baby walker as in claim 1, wherein, said receiving chamber of said wheel rim is provided with two side gear-chambers closely neighboring with said axial hole at both sides thereof, said transmitting gears are provided in said two side gear-chambers.

3. The ratchet wheel device on a baby walker as in claim 1, wherein, said stop portions on said walls of said gear-chambers are provided on the side walls of said gear-chambers.

4. The ratchet wheel device on a baby walker as in claim 1, said ratchet wheel device further comprises a cover, said cover covers said receiving chamber with said opening in said wheel rim.

5. The ratchet wheel device on a baby walker as in claim 4, wherein,
   two diagonally opposing bars are orthogonally extended from the peripheral edge of said cover, and two inverted hooks are provided in the front of said bars for fixedly engaging said wheel rim.

6. The ratchet wheel device on a baby walker as in claim 1, wherein, two fixing portions suitably separated from each other are provided on said chassis of said baby walker, said transmitting member protrudes and exposed to the outside of said wheel rim, both ends thereof are fixed respectively on said fixing portions by means of a fixing rod, while said wheel rim is located between said two fixing portions.

7. The ratchet wheel device on a baby walker as in claim 1, wherein,
   said transmitting member includes a sleeve and a fixing rod, said sleeve is extended into said axial hole in said wheel rim, said plurality of engaging teeth engage said transmitting gears, said fixing rod is extended into said sleeve and is fixed on said chassis of said baby walker.

* * * * *